United States Patent [19]

Stamp, Jr. et al.

[11] 4,333,316
[45] Jun. 8, 1982

[54] AUTOMATIC CONTROL APPARATUS FOR A HEAT PUMP SYSTEM

[75] Inventors: Custis L. Stamp, Jr., Tyler, Tex.; Rollie R. Herzog, Louisville, Ky.

[73] Assignee: General Electric Company, Louisville, Ky.

[21] Appl. No.: 196,413

[22] Filed: Oct. 14, 1980

[51] Int. Cl.³ .................. F25B 49/00; F25B 13/00
[52] U.S. Cl. ........................ 62/126; 62/160; 165/26; 236/51; 364/557
[58] Field of Search ............... 62/160, 126; 165/26, 165/29, 11; 236/46 R, 51, 47; 364/557, 120

[56] References Cited

U.S. PATENT DOCUMENTS

| | | | |
|---|---|---|---|
| 4,154,397 | 5/1979 | Carlson | 236/47 X |
| 4,274,145 | 6/1981 | Hendricks et al. | 236/46 R |
| 4,298,163 | 11/1981 | Richardson et al. | 236/51 X |

Primary Examiner—William E. Wayner
Attorney, Agent, or Firm—Frank P. Giacalone; Radford M. Reams

[57] ABSTRACT

A microprocessor based heat pump control apparatus having a user-operated system console and a system function controller is provided in which normal operating target temperature settings are automatically converted to an expanded operating temperature range (standby operating mode), having preset upper and lower target temperature settings, in response to predetermined operating conditions within the system. The system function controller is preprogrammed to respond to a predetermined number of invalid data signal communications emanating from the user-operated console to switch into the standby operating mode. Provision is made for the user to insert a standby mode instruction at the user-operated console. Provision is also made for the system controller to enter standby during a power-up sequence when invalid user-inserted volatile data is sensed from storage means used to retain the volatile data during the power-off time period.

13 Claims, 5 Drawing Figures

AUTOMATIC CONTROL APPARATUS FOR A HEAT PUMP SYSTEM

CROSS REFERENCE TO RELATED APPLICATIONS

This application is related to concurrently-filed applications, Ser. Nos. 196,411; 196,412, and 196,425, each filed jointly in the names of Custis L. Stamp, Jr. and Rollie R. Herzog; and Ser. No. 196,414, filed jointly in the names of Custis L. Stamp, Jr., Rollie R. Herzog and Michael A. Brennan, each assigned to General Electric Company, the assignee of the present invention.

BACKGROUND OF THE INVENTION

The present invention relates to automatic control apparatus for a heat pump system. In particular, it relates to apparatus which will serve in a dual manner either to operate the heat pump system in an energy saving mode, useful as a standby mode of operation when selected by the user, or to automatically switch the heat pump system into such a standby mode whenever certain predetermined conditions occur.

The basic functional operating modes for a heat pump system are HEAT and COOL during which the refrigerant compressor is operated to enable the heat exchange function to occur. The user-operated mode selection switch is generally included with the room thermostat control which is used to set the target temperature at which the room or other conditioned space is desired to be maintained, typically 72° F.

When the conditioned space is unoccupied, as for example when a resident is away on vacation, the resident may prefer to reset the thermostat for a new target temperature, such as 55° F. in the winter or 85° F. in the summer, so as to conserve energy and reduce the utility bill when it is not necessary to maintain temperatures at the normal 72° F. level.

In the past, electromechanical controls have been commonly employed as the heat pump control system. These have comprised simple switches, thermostatic sensors, meter type readout devices, and also, in some cases, electromechanical clock timers for such things as night-time temperature set-back controls. Although these electromechanical devices are adequate for the simple control they afford, there is a need for more sophisticated controls that will automatically adjust to different target temperatures in response to changing conditions. This could be as a convenience to the user, as where the conditioned space is vacant for long periods of time spanning hot and cold seasons, or could serve as a fail-safe device that would take over in the case of a defect occurring in the system.

SUMMARY OF THE INVENTION

In accordance with the invention, therefore, there is provided, in a heat pump system, control apparatus for switching the system from a selected normal functional operating mode to a standby operating mode in which temperatures in the conditioned space are maintained within an expanded temperature range having predetermined upper and lower temperature limits. To this end, the control apparatus comprises means for receiving and storing user-selected volatile data representing a desired target temperature for the conditioned space and a desired functional operating mode for the heat pump system. The control apparatus also includes means for supplying a data check code signal, the status of which indicates the validity or invalidity of the data signals emanating from the volatile data storage means. The control apparatus further includes means repetitively responsive to the stored volatile data signals and to the existence of valid data check code signals for operating the heat pump system in the user-selected functional operating mode. Means responsive to the data check code signal are provided for entering the heat pump system into the standby mode of operation when a predetermined number of invalid data check code signals are repetitively sensed in sequence. Finally, the control apparatus includes standby means responsive to an enter standby mode instruction to cause one or both of the predetermined upper and lower temperature limits to be established to supersede the user-selected target temperature and for operating the heat pump system to maintain the temperature of the conditioned space within said expanded temperature range.

In a preferred form of the invention, the control apparatus further includes means for supplying a control check code signal, the status of which indicates whether the heat pump system should be operating under one of the user-selected functional operating modes or in the standby mode, and means responsive to the control check code signal for placing the heat pump system in the standby mode whenever the control check code signal so indicates.

DESCRIPTION OF THE PREFERRED EMBODIMENT

Figure 1:
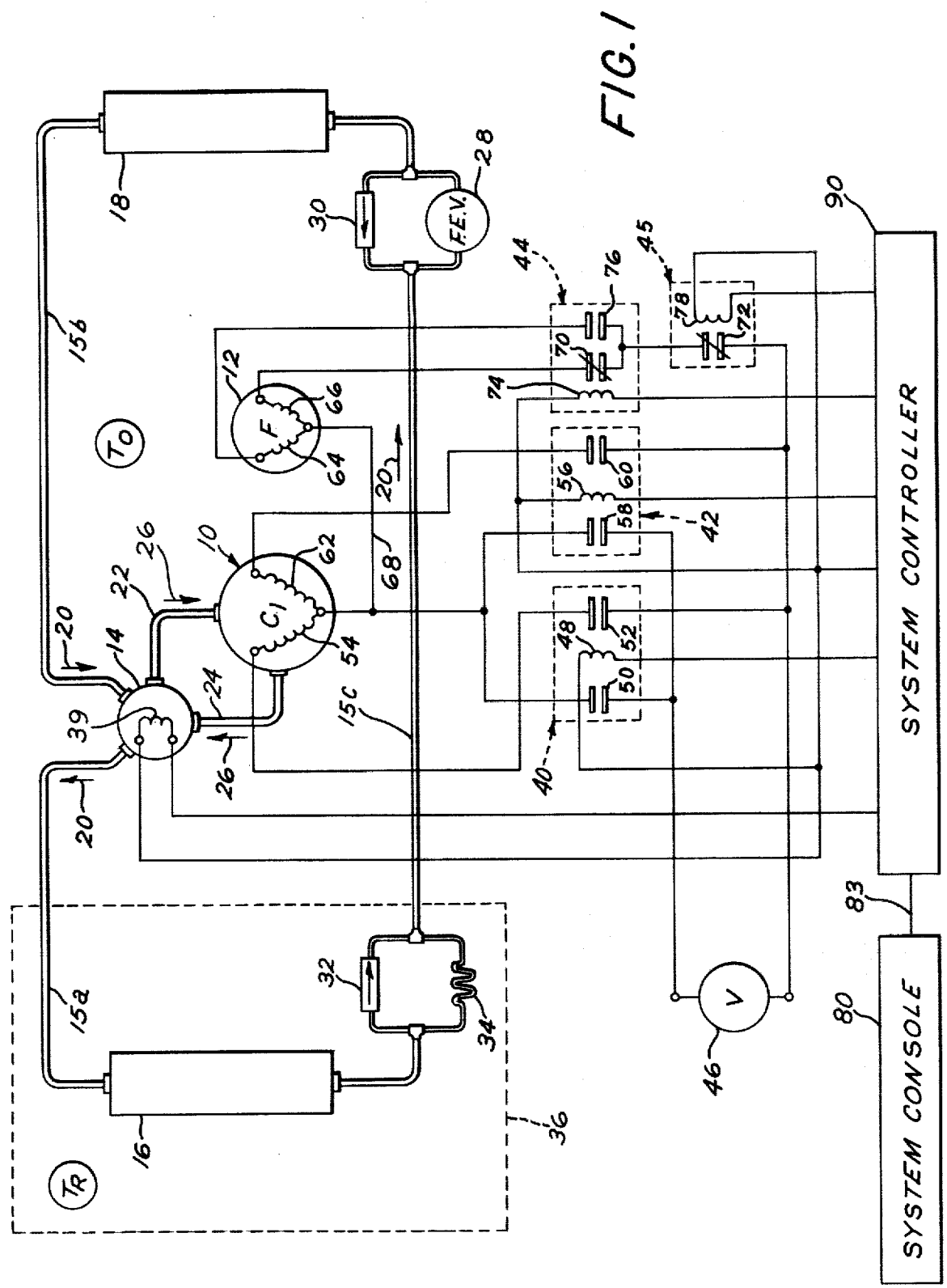
FIG. 1 is a diagram, partly schematic, of a heat pump system constructed in accordance with the present invention.

Referring now to FIG. 1, there is shown, in a preferred embodiment of the invention, a heat pump system which includes among its conventional components a two-speed compressor 10 and a two-speed fan 12. A conventional fluid switch-over valve 14 provides means for reversing the direction of flow of a fluid refrigerant through a series of pipe lines 15a, 15b and 15c and through an indoor and outdoor heat exchanger coil 16 and 18, respectively, in order to switch the operation of the heat pump system between the basic functional operating modes of heating and cooling. A series of arrows 20 indicates the direction of refrigerant flow between the valve 14 and coils 16, 18 when the heat pump is operating in the heating mode. The refrigerant flows through the lines 15a, 15b and 15c in the direction opposite that indicated by the arrows 20 when the heat pump is operating in the cooling mode. However, regardless of whether the heat pump is operating in the heating or cooling mode, the fluid refrigerant is always drawn from the valve 14 into a low pressure inlet port of the compressor 10 through a suction line 22 and is always delivered from a high pressure outlet port of the compressor 10 back to the valve 14 through a high pressure line 24, all as indicated by a pair of arrows 26.

When the heat pump is operating in the heating mode, a conventional fluid expansion valve 28 permits the refrigerant to expand rapidly therethrough to cool to its lowest temperature within the closed fluid circuit just prior to entry into the cold end of the outdoor coil 18. A conventional one-way check valve 30 remains closed to the flow of refrigerant therethrough when the heat pump is operating in the heating mode, but freely allows passage of the refrigerant therethrough to bypass the expansion valve 28 when refrigerant is flowing in the direction opposite the arrows 20, as when the heat pump is operating in the cooling mode. A second one-way check valve 32 permits the refrigerant to flow freely from the coil 16 into the line 15*c* when the heat pump is operating in the heating mode but remains closed to the flow of refrigerant therethrough when the heat pump is operating in the cooling mode, thus forcing the refrigerant through a conventional fluid restrictor or capillary tube 34.

A dashed enclosure 36 represents a closed structure, such as a room or a residence, the internal air space of which is conditioned by the heat pump system. Those components of the fluid conductive circuit located within the structure include the indoor coil 16, the valve 32 and the capillary tube 34. The fan 12 and the remaining components of the fluid conductive circuit, namely, the compressor 10, valves 14, 28 and 30, and the outdoor coil 18 are located outside of the structure to be air conditioned, in the outdoor ambient atmosphere.

Automatic control apparatus is also shown in FIG. 1, including system console 80 and system controller 90. These units, to be described in greater detail hereinafter, comprise a programmed electronic control system adapted to cause the heat pump system to operate in its normal functional operating modes in accordance with inputs provided from various condition sensors as well as those selected by the user. Additionally, they operate to switch automatically the heat pump system from a normal functional operating mode to a standby operating mode in which temperatures in the conditioned space 36 are maintained within an expanded temperature range having predetermined upper and lower temperature limits of, for example, 85° F. and 55° F., corresponding to 29.5° C. and 13° C. respectively.

Considering first the operation in the normal functional modes, controller 90, on command, supplies suitable low voltage a.c. operating potentials to relays 40, 42, 44 and 45 which, in turn, supply a suitable high voltage operating potential from a source 46 to the compressor 10 and fan 12. Source 46 may, for example, be the usual 240 volt, single phase potential. Additionally, controller 90 supplies a low voltage a.c. potential across solenoid coil 39 of the switch-over valve 14 to control the switchable state thereof, thus placing the heat pump system in either the basic HEAT or COOL operating mode. Controller 90 is also used to operate switch-over valve 14 during the HEAT mode to perform defrost operations for short periods of time by reversing the refrigerant circuit so as to raise the temperature of the coils in the outdoor heat exchanger unit 18 by an amount sufficient to melt any frost buildup on the coils. The principles of the defrost cycle performed on command from controller 90 are described in the aforementioned copending application Ser. No. 196,411.

Controller 90 operates heat pump compressor 10 at high speed by energizing coil 48 of the high speed compressor relay 40 to close two sets of normally open relay contacts 50 and 52, thus placing source 46 across a high speed coil 54 of compressor 10. Similarly, controller 90 operates compressor 10 at low speed by de-energizing relay coil 48 and energizing relay coil 56 of the low speed compressor relay 42 to close two sets of normally open contacts 58 and 60, thus placing source 46 across low speed coil 62 of compressor 10.

Fan 12 may also be operated at high or low speed by controller 90, depending upon which of the high or low fan speed coils 64 or 66 is energized from the source 46 by the fan speed control relay 44. A line 68 connects one end of each of the coils 64 and 66 to one side of the source 46 whenever either of the high or low speed compressor relays 40 or 42 is energized to operate the compressor 10. The other end of the low speed fan coil 66 is connected through a set of normally closed contacts 70 of the relay 44 and a set of normally closed contacts 72 of the fan lockout relay 45 to the other side of source 46 so as to operate fan 12 at low speed when both of relays 44 and 45 are de-energized. Controller 90 switches fan 12 to high speed operation by energizing relay coil 74 of the fan speed control relay 44, thus opening the contacts 70 and closing a set of contacts 76 to switch source 46 from the coil 66 to the coil 64. During defrosting operations, fan 12 is rendered inoperative by the controller 90 even though compressor 10 is running by energizing coil 78 of the defrost or fan lockout relay 45 thereby opening contacts 72 and disconnecting fan 12 from source 46.

System console 80 is the primary manual input and display device that interfaces with the user and includes various desired input switches, display registers and associated logic circuits for manual entry of user-selected control data into the control apparatus of the invention. Console 80 is preferably located at a position within conditioned space 36 that enables the user to have convenient access thereto. On the other hand, it will generally be preferred to have the more bulky system controller 90 located remotely from the console, such as in the basement or garage of a residence. Console 80 is, therefore, preferably coupled to controller 90 by means of conventional cabling schematically represented by line 83.

The heat pump system, as thus described, may be set to have five major modes of operation which are mutually exclusive. These modes are: (a) OFF, (b) HEAT, (c) COOL, (d) FAN ONLY, and (e) STANDBY, wherein the standby mode and the means for entering and implementing such STANDBY mode represent the subject matter of the present invention.

Considering first the normal functional operating modes, in OFF, no loads are actuated by controller 90. While in the HEAT mode, controller 90 will energize the appropriate heat pump loads as described in connection with FIG. 1 to bring the conditioned space, i.e. room temperature, to a user-selected target temperature. Controller 90 may also defrost the outdoor heat exchanger 18 in accordance with the defrost operation described in the aforementioned copending application Ser. No. 196,411. Similarly, while in the COOL mode the system will operate to make the room temperature equal to the user-selected target temperature. In the FAN ONLY mode, the system causes the indoor fan, not shown, to operate at a predetermined, e.g. low speed, speed with no other loads operated.

In accordance with a feature of the invention, the system operates to enter the STANDBY mode either automatically or by manual selection at console 80. In the STANDBY mode, controller 90 energizes appropriate loads corresponding to either a HEAT or COOL functional operating mode, depending on the actual room temperature conditions. Additionally, controller 90 acts to establish either of two new target temperatures which supersede the existing target temperature manually set in console 80 by the user. These new target temperatures correspond to the upper and lower limits of an expanded temperature range within which the room temperature is to be maintained during STANDBY operation. As previously mentioned, these target temperatures are preprogrammed into controller 90 and may, for example, be 55° F. for the HEAT mode and 85° F. for the COOL mode. The instructions for this operation are maintained within a microprocessor in controller 90.

Figure 2A:
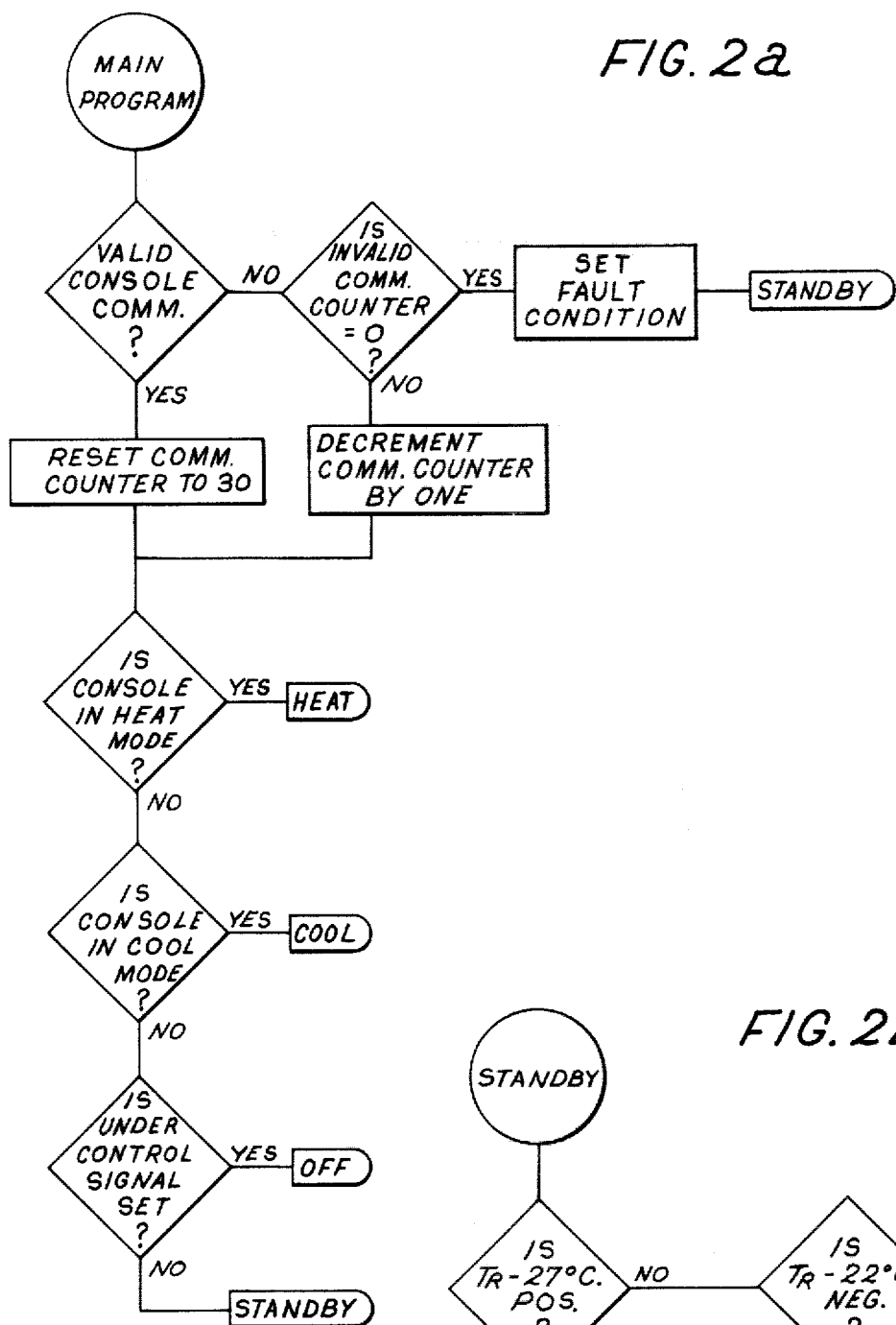
FIGS. 2a and 2b are microcomputer program flow diagrams for automatic control apparatus useful in the control of the FIG. 1 heat pump system in accordance with the present invention.
Figure 2B:
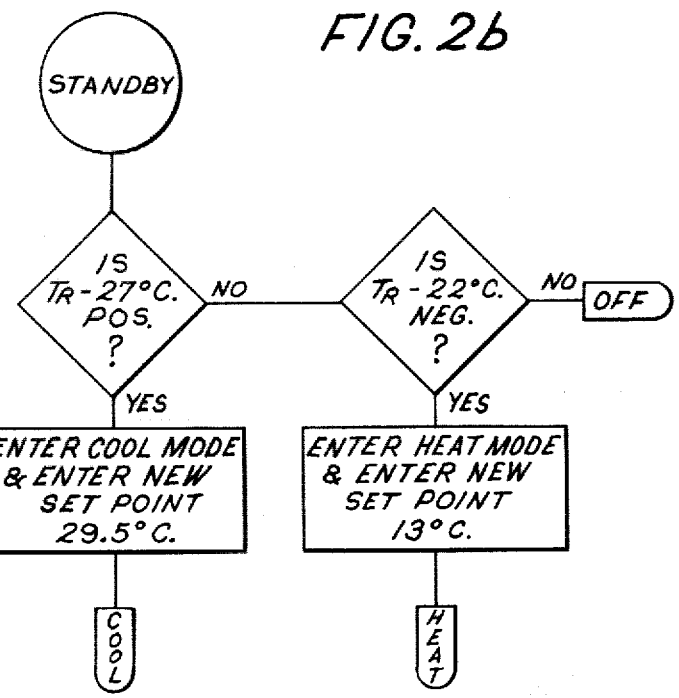

Referring now to FIGS. 2a and 2b, there are shown simplified flow diagrams for the MAIN and STANDBY program routines illustrating the programmed instruction steps performed by the microprocessor in controller 90. It will be understood that numerous instructional steps in addition to those shown in FIG. 2 are included in the main program routine but have been omitted from this discussion as not being required for an understanding of the present invention. In these flow diagrams, circles represent entry into a program routine, diamonds represent inquiries, rectangles represent actions, and bullets represent an instruction to enter another program routine named within the bullet. The apparatus for carrying out these instructions will be described subsequently in connection with FIGS. 3 and 4.

Thus, upon entering the MAIN program, the controller 90 first inquires whether it is receiving valid communication of data signals from console 80, the inquiry being performed, for example, by means of a comparison of redundant check code data signals. If the answer is YES, a communications counter is reset to a predetermined number, such as 30, and the microprocessor advances to the next inquiry. However, if the answer is NO, indicating invalid data, the controller 90 next inquires whether the communications counter is at a zero count indicative of the fact that a predetermined number of successive cycles of invalid data communications have been received from the console 80. In the embodiment to be considered, a total of thirty cycles is used as the governing criterion. Thus, if thirty successive cycles of invalid data have been received repetitively from console 80, the controller 90 sets the heat pump system into a FAULT condition and automatically causes the system to enter the STANDBY operating mode.

If the communications counter is not at zero count, the counter is decremented (reduced in count by one) and the controller steps to the next logic inquiry to determine if the console 80 is in the heat mode. If YES, the system enters the HEAT program. If NO, the controller then inquires if the console 80 is in the COOL mode, entering the COOL program if the answer is YES.

Assuming that console 80 is not in either the HEAT or COOL mode, controller 90 then logically inquires whether the system is properly operating under the control of console 80. For this purpose, a special "under control" binary check code signal is communicated from console 80 to controller 90, the "1" or "0" status of which is indicative of whether the heat pump system should be in the OFF or STANDBY mode. If the check code signal is in a "1" status, the controller enters the OFF mode program; if, in an "0" status, the controller enters the STANDBY mode program. The "0" status of the check code signal is also what would appear if a malfunction in console 80 occurred or if the console 80 were disconnected from the controller 90. In effect, therefore, the selection of STANDBY by the user causes the check code signal to the controller 90 to be the same as would be caused by a related malfunction in the console 80 or the disconnecting of console 80 from the controller 90, any of which would enter the system into the STANDBY mode.

Considering now the flow diagram for the STANDBY mode program, as illustrated in FIG. 2b, upon entering the program the first basic inquiry is whether the room temperature $T_R$ is higher than 27° C. (80.6° F.) and if YES, a new set point temperature of 29.5° C. (85° F.) is initiated in controller 90 to supersede the user-selected target temperature and the system then enters the COOL operating mode. If the room temperature is below 27° C., the next inquiry is whether it is below 22° C. (71.6° F.) and, if YES, a new set point temperature of 13° C. (55° F.) is initiated to supersede the user-selected target temperature and the system then enters the HEAT mode. If the room temperature is between 27° C. and 22° C., the system automatically enters the OFF program. Although the heat pump loads are disabled in the OFF program, the control apparatus continues to recycle through the MAIN and STANDBY program routines so that if conditions change, as for example the room temperature rises above or drops below the new set point temperature limits, the control apparatus automatically enters the appropriate HEAT or COOL mode needed to bring the room temperature back to the appropriate set point temperature.

It will be appreciated from the foregoing description that considerable convenience and/or energy saving is accomplished by this automatic STANDBY mode. For example, extended absence from the structure is not a problem since the system will automatically enter the mode of operation HEAT or COOL that is needed to keep the room temperature within reasonable bounds. Moreover, by being able to enter the STANDBY, either deliberately (e.g. vacation) or as a result of a fault occurring, needless waste of energy is avoided.

Figure 3:
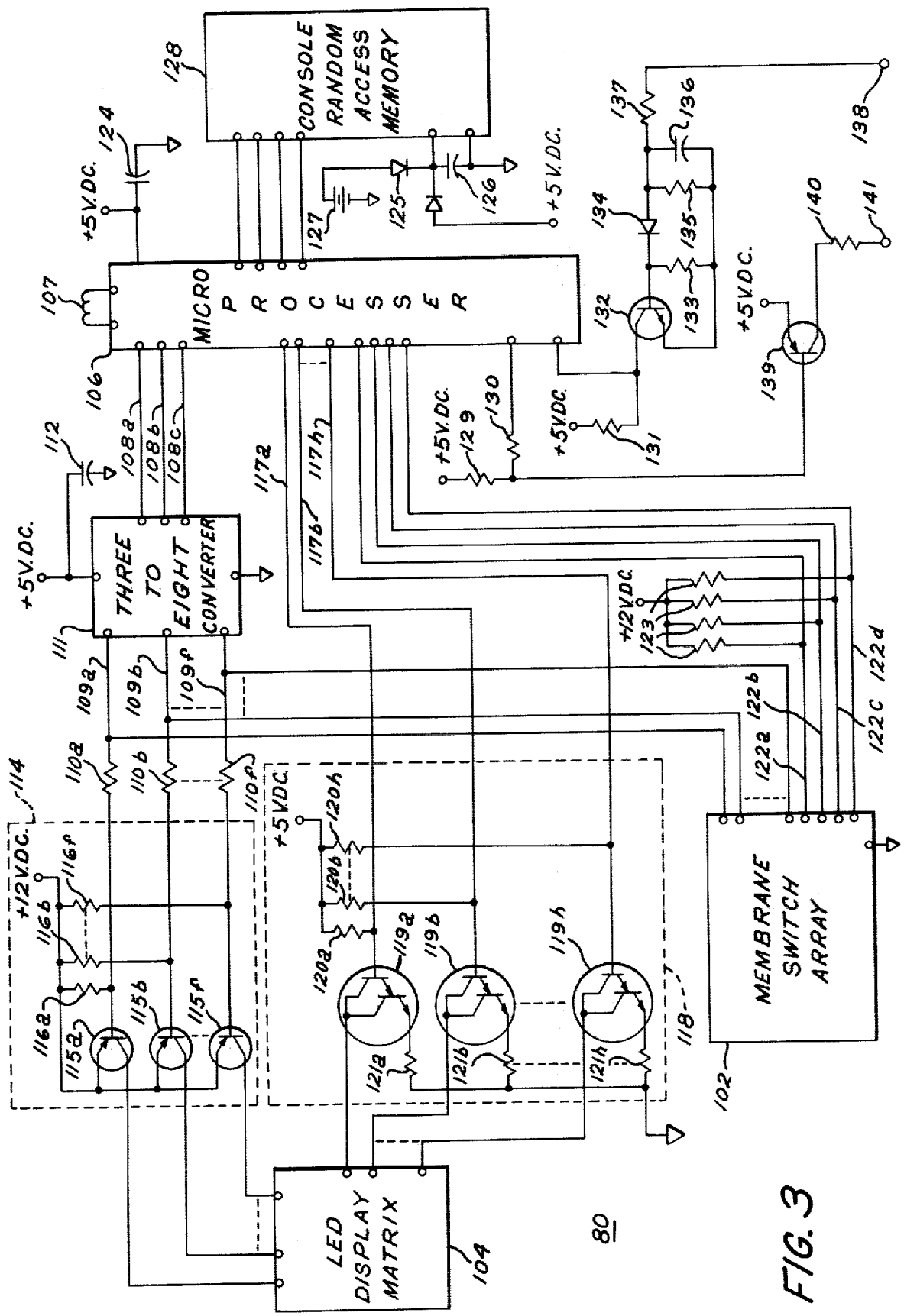
FIG. 3 is a diagram, party schematic, of an embodiment of the system control console 80 of FIG. 1.

Referring now to FIG. 3, system console 80 includes the basic user interactive devices comprising a membrane switch array 102 and a light emitting diode display matrix 104, both being of conventional construction and operation as used, for example, in electronic control packages for microwave ovens. Console 80 further includes a microprocessor 106 which is programmed to generate repetitive signals in digital binary form on output lines 108a–108c. Internal timing for the microprocessor is controlled in known manner by means of inductor 107. The binary signals on lines 108a–108c. are converted by three-to-eight converter 111 to provide on output lines 109a–109f a sequential series of six strobe signals which are applied through protective coupling resistors 110a–110f to column driver circuit 114 where they are current amplified in transistors 115a–115f and applied to six column connections of LED matrix 104. It will be appreciated that repetitive circuit elements in FIG. 3 have been omitted for the sake of simplicity, the omission being indicated by dotted lines. At appropriate points in the timing cycle, LED row drive signals are provided on eight output lines 117a–117h to row driver circuit 118 where they are current amplified in driver transistors 119a-119h and applied to the row connections of LED matrix 104. The particular display generated by matrix 104 is then a function of the coincidence of current drives generated by appropriate instructions from microprocessor 106 and appearing at the column and row inputs of matrix 104.

The strobe signals on output lines 109a-109f of converter 111 are also applied to the strobe inputs of membrane switch array 102. Depending on which switches in array 102 are closed, suitable conditioning signals are then applied to microprocessor 106 via lines 122a-122d, thus providing the user-inserted volatile data to the microprocessor.

The volatile data is stored within microprocessor 106 for continuous use during program operations within console 80 and controller 90. Additionally, the volatile data is stored in a separate CMOS random access memory 128 which has a separate power source, such as battery 127, to retain the volatile data in the event of a functional operating power failure. A special data check code signal is stored in memory 128 along with the volatile data and serves to provide an indication of validity or invalidity of the stored data after power is restored. It is possible, for example, for the data stored in memory 128 to be changed as a result of the power loss which would then incorrectly operate the heat pump system after power is restored.

As previously noted, console 80 is normally located in the structure where the air space is to be conditioned, while the controller 90 is normally located in a convenient storage location remote from console 80. It is, therefore, necessary to provide for data communication between console 80 and controller 90. In the case of communication from console 80 to controller 90, this is accomplished by an output circuit including amplifier transistor 139 leading to output terminal 141. Conversely, data signals from controller 90 are received from input terminal 138 and applied to the data input of microprocessor 106 via amplifier transistor 132.

Figure 4:
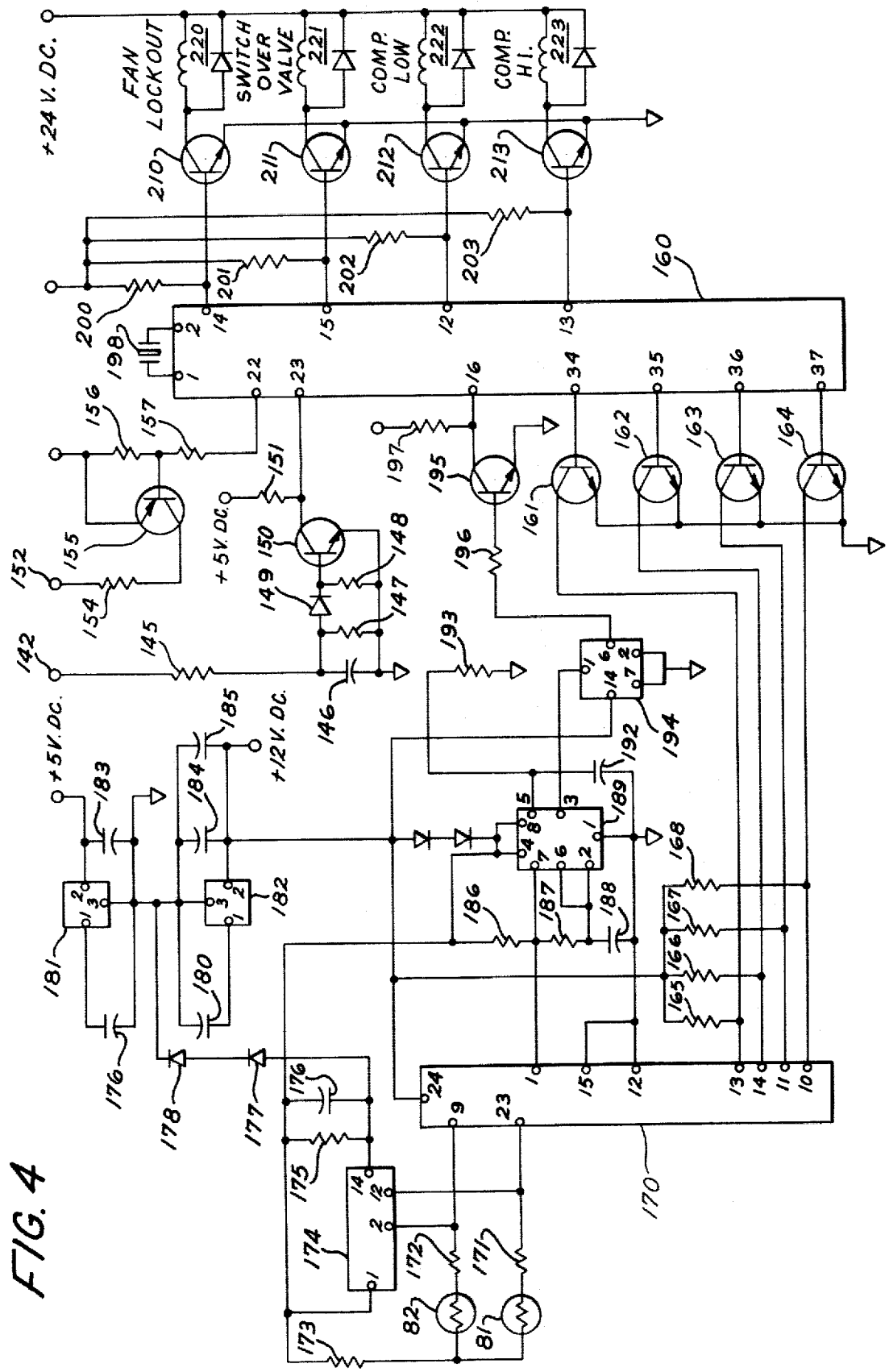
FIG. 4 is a diagram, partly schematic, of an embodiment of the system controller 90 of FIG. 1.

Considering now the controller 90 shown in FIG. 4, the data signals from terminal 141 of console 80 are coupled via cable line 83 (FIG. 1) to a data input of microprocessor 160 via input terminal 142, and amplifier transistor 150. Data output from microprocessor 160 is coupled via amplifier transistor 155 to output terminal 152 which in turn is connected via cable line 83 (FIG. 1) to input terminal 138 of console 80.

Indoor and outdoor temperature data, as sensed by thermistors 81 and 82, is read into microprocessor 160 in the following manner. Timing control signals on output terminal Nos. 34-37 of microprocessor 160 are coupled through buffer amplifiers 161-164 to input terminal Nos. 10, 11, 13, 14 of multiplexer 170 where they are suitably combined and serve to connect thermistors 81 and 82 to output terminal No. 1 of multiplexer 170. As the output of each thermistor appears in sequence on multiplexer terminal No. 1, it is coupled to the junction of resistors 186 and 187 at input terminal No. 7 of an oscillator circuit 189. Resistors 173 and 186 are included in circuit with the thermistors so as to tend to linearize the otherwise highly non-linear resistance versus temperature characteristics of the thermistors. The resistance network of the thermistor and resistors 172, 173, 186 and 187 in combination with capacitor 188 act to control the oscillation frequency of oscillator 189 to provide at oscillator output terminal No. 3 a signal, the frequency of which is representative of the temperature being sensed by the thermistor in question. This signal is then applied to a "divide-by-sixteen" flip flop 194 to reduce the temperature signal frequency to a range which is suitable for use by microprocessor 160. In this manner, oscillator 189 operates at a relatively higher frequency thus enabling capacitor 188 to be reasonably small in value.

The temperature signal is then applied through buffer amplifier 195 to input terminal No. 16 of microprocessor 160 where the period of the signal frequency is monitored to convert to a temperature value. To accomplish this, microprocessor 160 executes a preprogrammed subroutine to count the number of pre-established time increments between the leading and lagging edges of each half cycle of the square wave appearing at the output of flip flop 194. This number is then compared by another subroutine in microprocessor 160 to a "temperature" table in its read only memory (ROM) to determine the temperature being sensed by the thermistor in question. By suitably programming this number table into the ROM of microprocessor 160, a further linearization of the thermistor is obtained.

An external timing signal, (not shown) applied to microprocessor 160, is used to initiate the operation of the MAIN program described in connection with the flow diagram of FIG. 2. At appropriate times in each program, the internal timing of microprocessor 160 being set by crystal 198, the temperatures are read as just described. The volatile data signal from system console 80, including the user-selected target temperature, is sensed at the proper time on input terminal No. 23 of microprocessor 160. In a preferred embodiment of the invention, the microprocessor 106 of console 80 sends the data to controller 90 via cable 83 (FIG. 1) with one or more bytes thereof comprising sets of the volatile data in redundant form. In this way, the microprocessor 160 can check some or all of the bytes of incoming data to determine whether there is valid data communication to the controller 90. It will be recalled this forms the first inquiry of the flow diagram, FIG. 2a. In accordance with a further preferred embodiment of the invention, the digital signal from console 80 includes what might be referred to as an "under control" check code signal. The purpose of this signal is to provide an indication to the controller 90 during the STANDBY program routine that console 80 is properly connected to the controller 90 and that the controller should continue to operate under the control of console 80 even though neither the HEAT nor the COOL mode has been selected. Such a situation would obtain, for example, when the OFF or FAN ONLY modes are selected. Also, as described above, it is possible for the CMOS RAM 128 in the system console 80 to furnish incorrect volatile data after a power loss to the system. When this occurs, the microprocessor 106 causes the "under control" check code signal to be disabled. In the preferred embodiment of the invention, the absence of this "under control" check code signal indicates that the user has selected the STANDBY mode, or that the console has been disconnected, or that some other fault has occurred which dictates that controller 90 should now take over the control of the functional operation of the heat pump system. This then serves as a fail-safe mode of operation that, for example, would prevent the disabling of the system console in a residence from allowing temperatures to drop so low during the winter season as to cause bursting of water pipes.

As previously mentioned, the STANDBY mode can be manually selected by the user at the console and thus, in effect, STANDBY selection causes the "under control" check code signal to be disabled, thus forcing controller 90 to take over the operational control of the heat pump system as described above.

Actual electrical control of the heat pump functional components is accomplished from output pins 14, 15, 12 and 13 which are connected, respectively, to 24 volt relay coils 220–223. These relay coils are included in controller 90 and their contacts, not shown, are connected in conventional manner via a 24 VAC source to the functional power control relays described in connection with FIG. 1. For convenience, the contacts of "Hi Comp." relay 223 in controller 90 are connected in common to the compressor power relay coil 56 and fan power relay 74 since both are activated simultaneously in operation of the heat pump system.

In the following table, there is shown exemplary data for components employed in an actually constructed and operated system console 80 and system controller 90.

TABLE

| COMPONENT | SPECIFICATION | COMPONENT | SPECIFICATION |
|---|---|---|---|
| Resistors: | | Capacitors: | |
| 110a–110f | 390 ohm, ¼ W. | 112,124,136, 146,185 | 0.1 mfd, 100 v. |
| 116a–116f | 2.0K ohm, ¼ W. | | |
| 120a–120h, 130,157, 200–203 | 3.3K ohm, ¼ W. | 126,179,184 | 6.8 mfd, 35 v. |
| | | 176 | 4.7 mfd, 35 v. |
| | | 180 | 3.3 mfd, 75 v. |
| 121a–121h | 56 ohm, 1 W. | 183 | 33 mfd, 10 v. |
| 123a–123d, 129,133,148,156 165–168,196 | 10K ohm, ¼ W. | 188 | 0.12 mfd, 200 v. |
| | | 192 | 0.01 mfd, 100 v. |
| 135 | 2.7K ohm, ¼ W. | Transistors: | |
| 131,151,197 | 4.7K ohm, ¼ W. | 115a–115f | MPS 6562 |
| 140,154 | 68 ohm, ½ W. | 119a–119h | D40 CIN |
| 137,145 | 1.0K ohm, ¼ W. | 132,150 | MPS 2222 |
| 147 | 2.2K ohm, ¼ W. | 139,155 | MPS 2907 |
| 171,172 | 270 ohm, ¼ W. | 161–164, 195 | RCA CA3081 |
| 173 | 3240 ohm, ⅛ W. ½% | 210–213 | GES 6016 |
| 175 | 680 ohm, ½ W. | | |
| 186 | 20K ohm, ⅛ W., ½% | | |
| 187 | 150 ohm, ¼ W. | | |
| 193 | 270K ohm, ¼ W. | | |
| Other: | | | |
| Crystal 198 | 3.579545 Mhz | Flip-Flop 194 | MC 14024 BCP |
| Discrete diodes | DT 230H | Oscillator 189 | MC 1555 U |
| Diode chip 174 | TID126N | Multiplexer 170 | CD 4067 BE |
| Voltage reg. 181 | LAS 1505 | Microprocessors 106,160 | MK3870 (Mostek) |
| Voltage reg. 182 | LAS 1512 | | |
| "3 to 8" Conv.111 | TI SN7445N | RAM 128 | MCM 14501 -3P (Motorola) |

While, in accordance with the patent statutes, there has been described what at present is considered to be a preferred embodiment of the invention, it will be obvious to those skilled in the art that various changes and modifications may be made therein without departing from the invention. It is, therefore, intended by the appended claims to cover all such changes and modifications as fall within the true spirit and scope of the invention

What is claimed is:

1. In a heat pump system, automatic control apparatus for switching the heat pump system from a normal functional operating mode to a standby operating mode in which temperatures in the conditioned space are maintained within an expanded temperature range having predetermined upper and lower temperature limits, the control apparatus comprising:

means for receiving and storing user-selected volatile data representing a desired target temperature for the conditioned space and a desired functional operating mode for the heat pump system;

means for supplying a data check code signal, the status of which indicates the validity or invalidity of the data signals emanating from the volatile data storage means;

means repetitively responsive to the stored volatile data signals and to valid data check code signals for operating the heat pump system in the user-selected functional operating mode and for entering the heat pump system into the standby mode when a predetermined number of invalid data check code signals are repetitively sensed in sequence;

and standby means responsive to an enter standby mode instruction to cause one or both of said predetermined upper and lower temperature limits of the expanded temperature range to be established to supersede the user-inserted target temperature and for operating the heat pump system to maintain the temperature of the conditioned space within said expanded temperature range.

2. The automatic control apparatus of claim 1 in which said volatile data is stored and available in the form of bytes of digital signals and said data check code signal comprises redundant bytes of data signals appearing immediately after the corresponding data signal and in which said means repetitively responsive to the data and check code signals determines the validity status of said check code signals by comparing at least a portion of a byte of data signal with a corresponding portion of said corresponding redundant byte of check code signal.

3. The automatic control apparatus of claim 1 in which said repetitively responsive means enters the heat pump system into the standby mode after a predetermined number of complete program cycles have been completed in sequence with at least one invalid check code signal in each cycle.

4. The automatic control apparatus of claim 1 in which said repetitively responsive means includes a counter for decrementally accumulating a count for each sensed invalid check code signal and in which said counter is reset to initiate a new decremental count when the repetitive sequence of invalid data check code signals is interrupted by a valid data check code signal.

5. The automatic control apparatus of claim 1 in which said repetitively responsive means sets a fault indication visible to the user when said predetermined number of invalid data check code signals is sensed.

6. The automatic control apparatus of claim 1 in which the apparatus further comprises means for supplying a control check code signal, the status of which indicates whether the heat pump system should be operating under one of the user-selected functional operating modes or in the standby mode;
and means responsive to the control check code signal for placing the heat pump system in the standby mode whenever the control check code signal so indicates.

7. The control apparatus of claim 6 in which the standby mode is entered whenever the control check code signal is absent or otherwise indicates that the standby mode has been selected by the user.

8. The control apparatus of claim 6 further including user-operated means for manually setting said control check code signal into a standby mode.

9. The control apparatus of claim 1 or 6 further including means for reverting the heat pump system to normal functional operating mode when said check code signals indicate the standby mode should be terminated.

10. The automatic control apparatus of claim 1 in which the volatile data storage means includes a separate memory operable to maintain data storage when functional operating power to the heat pump system is disabled and in which the data check code signal supply means includes means operative after restoration of power for indicating validity or invalidity of the data emanating from said separate memory and in which said repetitively responsive means enters the heat pump system into said standby operation in response to invalid data emanating from said separate memory.

11. In a heat pump system, automatic control apparatus for switching the heat pump system from a normal functional operating mode to a standby operating mode in which temperatures in the conditioned space are maintained within an expanded temperature having predetermined upper and lower temperature limits, the control apparatus comprising:
user-operated console means for receiving and storing user-selected volatile data representing desired operating conditions for the heat pump system, said console means including means for supplying at least one check code signal;
system controller means responsive to volatile data from said console means for controlling the functional operation of the heat pump system in any of a plurality of different operating modes, said controller means including means responsive to said at least one check code signal from said console means to place said heat pump system into said standby operating mode when said check code signal so indicates.

12. The automatic control apparatus of claim 11 in which said console means includes first means for storing said volatile data for periodic use by said system controller means and second means having an independent power source for redundant storage of said volatile data for retention of said data in the event of loss of primary power to said heat pump system, said console means further including means to check the validity of said redundant data after restoration of said primary power and for conditioning said controller means to enter standby operation in the event invalid redundant volatile data is sensed.

13. The automatic control apparatus of claim 11 in which said at least one check signal from said console means is adapted to represent valid or invalid communication of data from said console means to said controller means and in which said controller means responds thereto to place the heat pump system into said standby operation in response to said check code signal representative of invalid data communication.

* * * * *